(12) United States Patent
Scott (10) Patent No.: US 7,524,142 B2
(45) Date of Patent: Apr. 28, 2009

(54) SUBSURFACE INSTALLATION OF TUBING

(75) Inventor: Vern Keith Scott, Golden, CO (US)

(73) Assignee: Vermeer Manufacturing Company, Pella, IA (US)

( * ) Notice: Subject to any disclaimer, the term of this patent is extended or adjusted under 35 U.S.C. 154(b) by 204 days.

(21) Appl. No.: 11/141,801

(22) Filed: May 31, 2005

(65) Prior Publication Data

US 2006/0266533 A1 Nov. 30, 2006

(51) Int. Cl.
*F16L 3/22* (2006.01)

(52) U.S. Cl. .................. 405/181; 172/316; 405/178; 405/183

(58) Field of Classification Search .......... 405/178, 405/181, 183; 172/180
See application file for complete search history.

(56) References Cited

U.S. PATENT DOCUMENTS

| 882,649 A | 3/1908 | Noble ................. 405/177 |
| 2,155,044 A | 4/1939 | Gray et al. .............. 405/181 |
| 2,184,912 A | 12/1939 | Freeman et al. ............ 405/157 |
| 3,140,745 A * | 7/1964 | Pope et al. ................ 172/292 |
| 3,408,823 A * | 11/1968 | Okita et al. ................ 111/199 |
| 3,456,450 A * | 7/1969 | Teichmann ................ 405/181 |
| 3,659,426 A | 5/1972 | Caldwell ................... 405/181 |
| 3,851,489 A | 12/1974 | Richardson ............... 405/178 |
| 4,092,936 A | 6/1978 | Griffin et al. .............. 111/199 |
| 4,318,638 A | 3/1982 | Promersberger et al. .... 405/177 |
| 4,397,585 A * | 8/1983 | Fouss et al. ................ 405/183 |
| 4,447,173 A * | 5/1984 | Schultz et al. ............. 405/181 |
| 4,461,598 A | 7/1984 | Flechs ...................... 405/181 |
| 4,637,755 A * | 1/1987 | Tollefson et al. ........... 405/181 |
| 5,165,351 A * | 11/1992 | Billings .................... 111/199 |
| 5,281,054 A * | 1/1994 | O'Riordan ................ 405/182 |
| 5,906,167 A * | 5/1999 | Miyachi .................... 111/200 |
| 5,913,638 A | 6/1999 | Lansdale ................... 405/179 |
| 6,511,260 B2 * | 1/2003 | Kenkel et al. .............. 405/178 |

OTHER PUBLICATIONS

Vermeer—V5750 Hydrostatic Trencher/Plow brochure.
Vermeer—Vibratory Plow SP11/SP15 Brochure.
"Don't Let Wet Turf Bog You Down"—http://www.waterwick.com/index.html.

* cited by examiner

*Primary Examiner*—Tara L. Mayo
(74) *Attorney, Agent, or Firm*—Merchant & Gould P.C.

(57) ABSTRACT

A tractor attachment for installing tubing beneath the ground includes a frame having a toolbar to which multiple plow assemblies are coupled and spaced apart by rigid spacers. Each plow assembly includes a plow blade and a drop feed tube, mile plow blades extend downwardly in a first direction from the toolbar and the drop feed tubes extend downwardly in a second direction from the toolbar. In operation, the multi-plow attachment is lowered such that the plow blades engage a body of soil at a desired depth. The desired depth at which the plow blades engage the soil is based at least in part on the pitch of the plow blades. The tractor moves forward to cause the plow blades to create trenches in the soil at substantially the desired depth and strands of conduit (e.g., drip irrigation tubing) are fed from the drop feed tubes to the created trenches.

20 Claims, 10 Drawing Sheets

SUBSURFACE INSTALLATION OF TUBING

TECHNICAL FIELD

The present invention generally relates to the installation of tubing into the ground, and more particularly, to the subsurface installation of irrigation tubing.

BACKGROUND

One of the more popular irrigation techniques involves the use of drip irrigation conduit having numerous apertures through which is dispensed controlled amounts of water into the earth adjacent to a row of plants. In this approach, which is commonly referred to as "drip irrigation," the drip irrigation conduit may be installed either above or beneath the surface of the earth, the latter of which is referred to herein as "subsurface drip irrigation." Subsurface drip irrigation is particularly advantageous over above-ground irrigation methods because water dispensed from subsurface tubing is not affected by evaporation. Furthermore, subsurface tubing is less likely to be damaged by implements and animals than tubing and other components of above-ground irrigation. For this latter reason, it is often advantageous to install other forms of conduit (e.g., electrical conduit) below the surface of the earth as well.

There are a number of different approaches for installing conduit below the surface of the earth. One approach involves the use of an upright plow having a plow blade, a drop fee tube and a coiled conduit source. In operation, a service operator pushes the upright plow over the surface of terrain in which conduit is to be installed. With respect to drip irrigation, the terrain typically includes a row of plants and the upright plow is pushed adjacent the row. The plow blade cuts a trench in the terrain adjacent the plant row and conduit from the coiled conduit source is top-fed through the drop feed tube into the trench.

While those skilled in the art recognize the popularity of upright plows to install drip irrigation (largely due to its relative inexpensiveness), this particular installation approach has several drawbacks. For example, pushing the upright plows through the ground requires great physical assertion on the part of the service operator. To address this concern, several implementations of the upright plow include a vibratory box that induces an oscillation in the plow blade in order to facilitate the creation of troughs thereby. Still, however, some physical assertion is required to create the troughs even though to a lesser extent and, as such, the incorporation of vibratory boxes to the upright plows is not the be all end all solution. Furthermore, conventional upright plows only allow for the installation of a single conduit at a time, and consequently, the physical assertion required by the operator must be repeated for each row of plants that require drip irrigation.

Tractor-implemented plow designs provide a solution to both of the above-noted drawbacks to upright plows. In these designs, a tractor is provided with a structure having multiple plow blades, multiple drop feed tubes and multiple coiled conduit sources. Such a design is described in U.S. Pat. No. 4,447,173 issued to Charles R. Shultz et al. and entitled "Apparatus for Burying Drip Irrigation Tubing." This particular plow implementation is used to install drip irrigation conduit into beds between furrows in a terrain being used to harvest crops. To accomplish this, the plow includes multiple furrow tracking members, with one furrow tracking member being located on each side of the plow blades. In operation, the furrow tracking members ride in the furrows as the tractor moves forward thereby maintaining the contour of the crop beds while the plow blades create trenches therein. Concurrently, conduit from the multiple coiled conduit sources is fed through the drop feed tubes into the created trenches.

The Shultz design is particularly effective for installing multiple strands of drip irrigation conduit into terrain in which crops have been planted between furrows. However, this design is not well suited for the installation of conduit into non-furrowed terrain, such as lawns, playing fields, construction ground, etc. Furthermore, even with the use of this design in furrowed terrain, Shultz's multiple plow structure is limited in that if any one of the plow blades or furrow members encounters an obstacle (e.g., rock, tree root, etc.), the physical confrontation of that plow blade or furrow with the obstacle is communicated through the structure to all of the plow blades, thereby affecting all troughs under creation.

SUMMARY OF THE INVENTION

Against this backdrop the present invention has been developed. Generally, the present invention relates to installing multiple strands of conduit below the ground. An embodiment of the present invention is practiced as an apparatus referred to as a multi-plow attachment. The multi-plow attachment includes a horizontal toolbar and multiple plow assemblies, which are coupled to the horizontal toolbar. The plow assemblies are spaced apart from one another across the horizontal toolbar by rigid spacers. Each of the assemblies include a blade and a feed tube. The blade downwardly extends from the horizontal toolbar in a first direction. In contrast, the feed tube downwardly extends from the horizontal toolbar in a second direction opposite the first direction.

In use, the apparatus is pulled across the ground and the plow blades create trenches of substantially a desired or otherwise predetermined depth. The feed tubes accept strands of conduit from coiled conduit sources and deposit the accepted conduit strands in the trenches created by the blades while the apparatus is being pulled across the ground. As such, the strands of conduit are installed at substantially the desired depth below the surface of the ground. In accordance with an embodiment, the multi-plow attachment also includes a vibratory box that induces oscillations in the plow assemblies in order to facilitate creation of trenches by the blades.

In another embodiment, the present invention is practiced as a method for installing multiple strands of conduit below a surface of ground using a multi-plow attachment having a plurality of plow blades and drop feed tubes. The method involves determining a pitch for the plow blades operable to create a trench in the ground having a desired depth relative to the surface. In an embodiment, determination of the sufficient pitch involves taking into consideration an actual quantity of the plurality of plow blades. More particularly, the greater number of plow blades that will be coupled to the multi-plow attachment, the greater the pitch required for the plow blades to be operable to create trenches having the desired depth.

After the sufficient pitch has been determined, the method proceeds to the act of lowering the multi-plow attachment such that the plurality of plow blades engage the ground at substantially the desired depth. This lowering act is based at least in part on the determined pitch of the plow blades. Next, the method involves feeding the strands of conduit through the drop feed tubes and subsequently anchoring to the ground an end portion of each of the conduit strands. Finally, in this embodiment, the method proceeds to an act of pulling the multi-plow attachment across the surface of the ground such that the plurality of plow blades create trenches of substantially the desired depth in the ground and the drop feed tubes are deposited therein.

These and various other features as well as advantages, which characterize the present invention, will be apparent from a reading of the following detailed description and a review of the associated drawings.

DETAILED DESCRIPTION

The present invention and its various embodiments are described in detail below with reference to the figures. When referring to the figures, like structures and elements shown throughout are indicated with like reference numerals.

Generally speaking, the present invention relates an apparatus and associated method for installing multiple strands of conduit below the ground. As such, the installation of these strands of conduit is referred to herein as "subsurface installation." As described in more detail below in accordance with embodiments of the present invention, the apparatus includes multiple plow blades and multiple drop feed tubes (collectively, "plow assemblies"). Conduit is fed to the multiple drop feed tubes from a plurality of conduit sources. In an exemplary embodiment, the conduit is irrigation tubing, and more particularly, drip irrigation tubing. It should appreciated, however, that other forms of conduit are contemplated within the scope of the present invention, including, without limitation, electrical and plumbing conduit, which may or may not be formed of Polyvinylchloride ("PVC"), as well as other forms of tubing, such as, without limitation, seed tape, power lines and utility lines.

Figure 1:
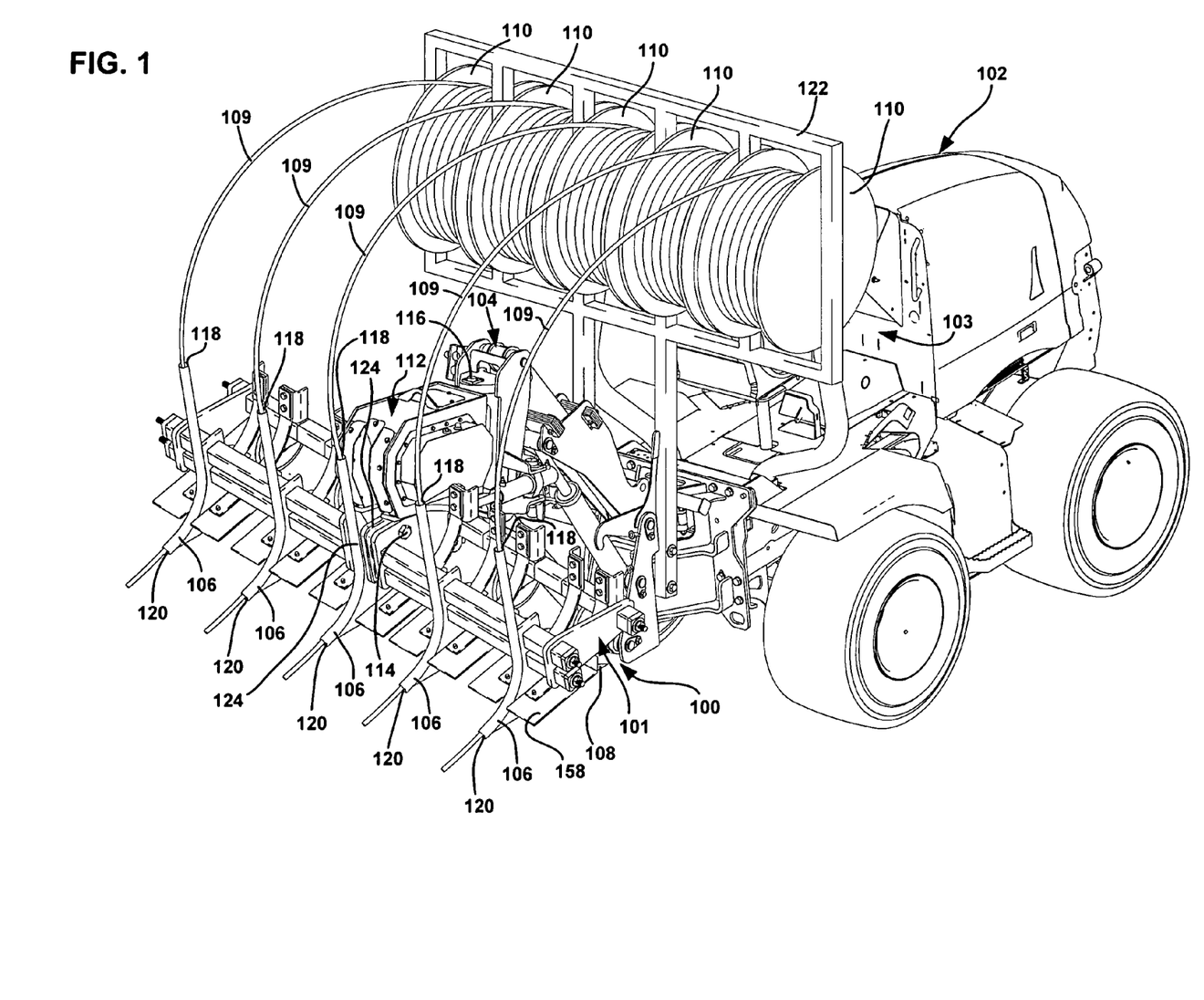
FIG. 1 depicts a tractor having an attachment for installing multiple strands of conduit below the surface of the ground in accordance with an embodiment of the present invention.

With reference to FIG. 1, the apparatus for installing multiple conduit strands into the ground is shown as an attachment 100 to a tractor 102 in accordance with an embodiment of the present invention. As such, FIG. 1 illustrates an exemplary environment for practicing the present invention. The tractor 102 includes a hydraulic arm 104 onto which any number of attachments (e.g., back hoe, back-end loader, etc.) may be affixed to the tractor 102 and consequently raised and lowered by controls (not shown) mounted in a cab region 103 of the tractor 102. It should be appreciated that the tractor 102 and the hydraulic arm 104 are generally shown and represent any tractor and hydraulic arm, respectively, known to those skilled in the art. Even further, the hydraulic arm 104 may be replaced by a non-hydraulic arm that is not operable to lower and raise any attachments (e.g., attachment 100, back hoe, back-end loader, etc.) affixed thereto. Indeed, the actual structure and functionality of the tractor 102 and hydraulic arm 104 may depart from that shown in FIG. 1 without departing from the scope of the present invention.

Figure 2:
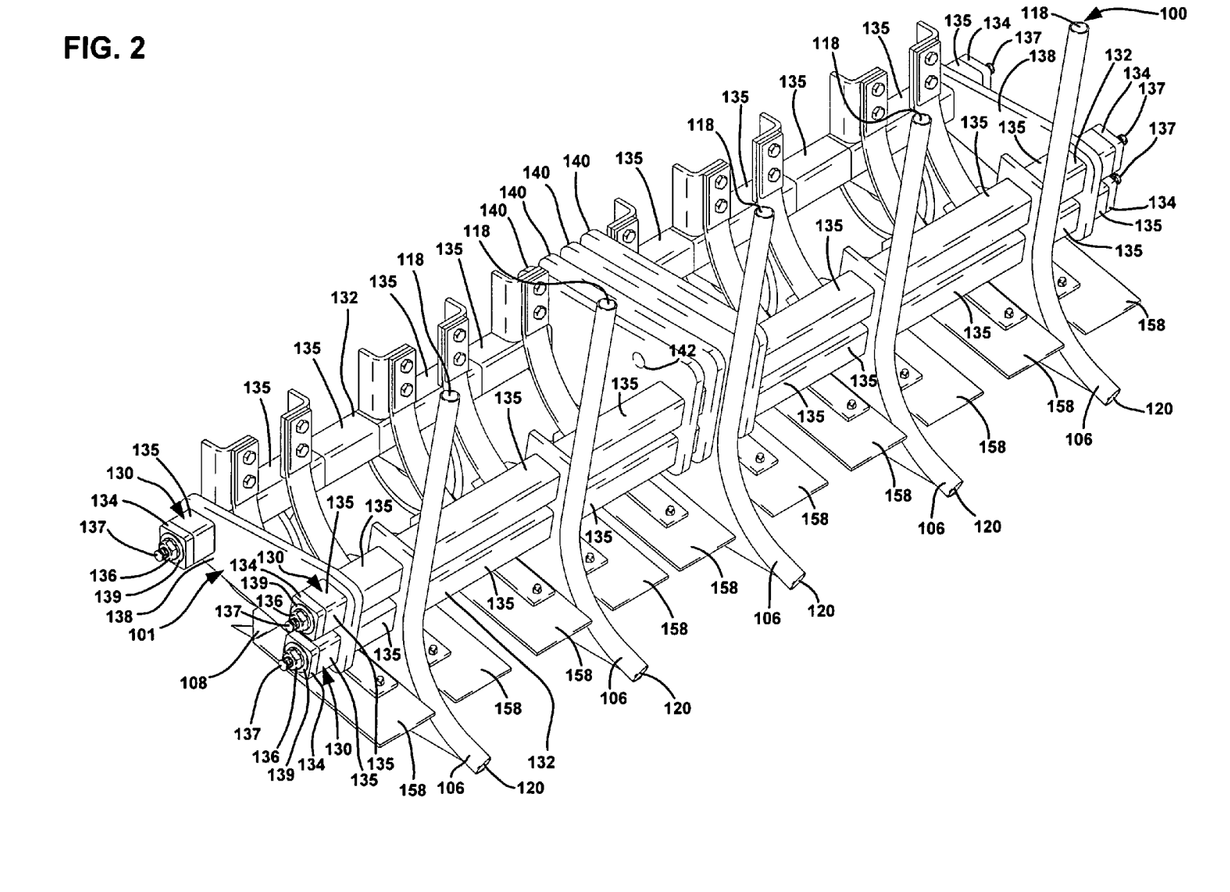
FIG. 2 depicts in greater detail various components on the attachment of FIG. 1 including plow assemblies each having a drop feed tube and a plow blade.
Figure 3:
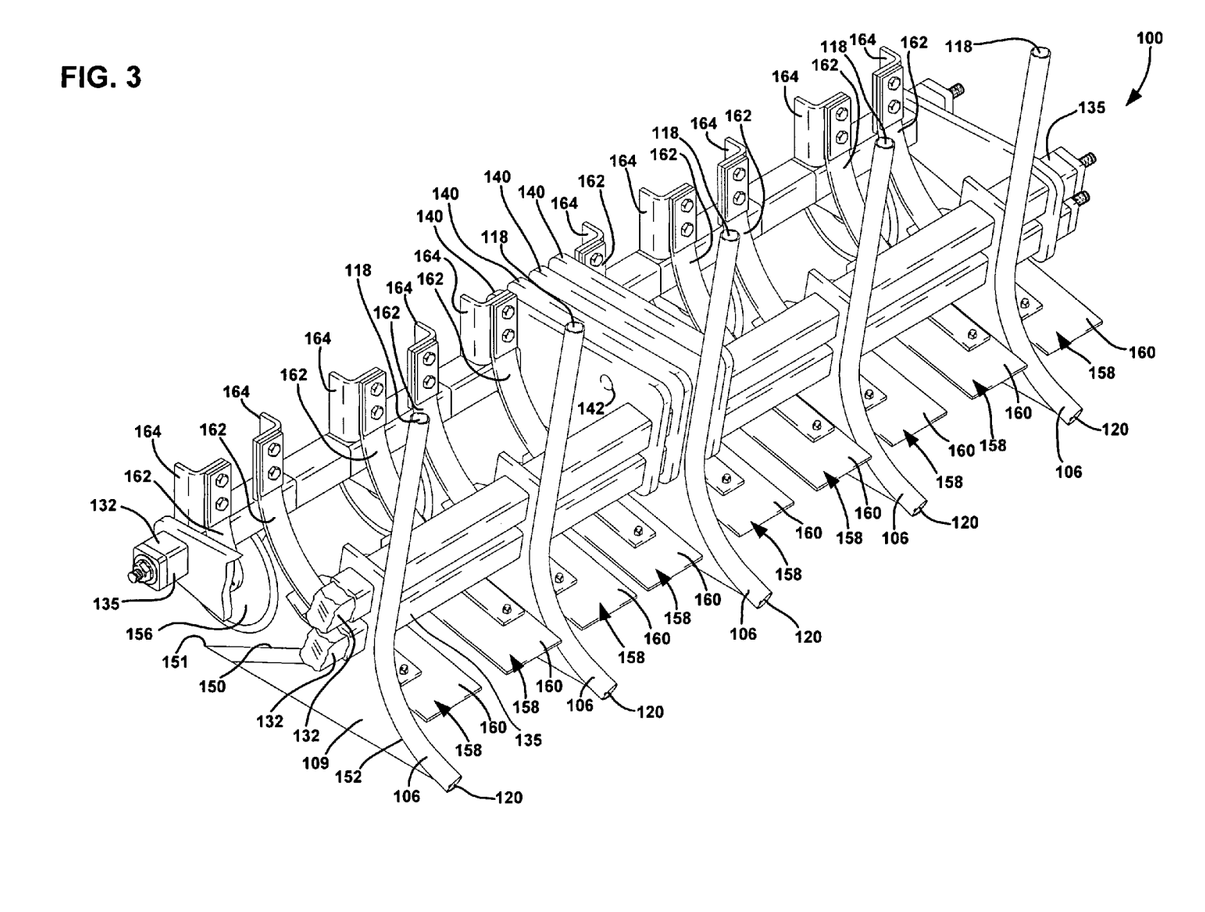
FIG. 3 depicts in greater detail various other components on the attachment of FIGS. 1 and 2 including coulter discs and terrain push downs.

The attachment 100, which is referred to herein for illustrative purposes as a "multi-plow" attachment, includes a frame 101 onto which is coupled a plurality of drop feed tubes 106 and a plurality of plow blades 108, each of which are shown in greater detail in FIGS. 2-3. The term "coupled" is used above and throughout the detailed description and claims in a general sense to refer to the direct or indirect mechanical connection of one component to another. For example, the plurality of plow blades 108 are described as being coupled to the frame 101, and therefore may directly and actually contact the frame 101 or, alternatively, may be indirectly coupled to the frame by way of one or more other components.

In accordance with an embodiment, the multi-plow attachment 100 also includes a vibratory box 112 for inducing oscillations in the frame 101, which in turn communicate the oscillations to each of the plurality of plow blades 108. These oscillations facilitate the creation of trenches in the ground by the plow blades 108. The vibratory box 112, which can be any vibratory box known to those skilled in the art, is the coupling between the frame 101 and the hydraulic arm 104. In accordance an exemplary embodiment of the present invention, these mechanical connections are shown in FIG. 1 using conventional bolt and nut pairings. In this regard, the vibratory box 112 includes a pair of mounting plates 124 that are coupled to the frame 101 by way of a first bolt 114. The vibratory box 112 also includes a pivot mounting bracket (not shown) that is coupled to the hydraulic arm 104 by way of a second bolt 116. As such, by connecting the vibratory box 112 to the hydraulic arm 104 by way of the second bolt 116, the vibratory box 112 is operable to pivot or yaw about a vertical axis of the second bolt 116. Other known connection means, including non-pivotal connection means (e.g., welding), are contemplated within the scope of the present invention and, as such, the present invention is not limited to the mechanical couplings between the vibratory box 112 and the frame 101 and the vibratory box 112 and the hydraulic arm 104 being bolt and nut pairings.

Each of the plurality of drop feed tubes 106 includes an input aperture 118 and an output aperture 120. Whereas the input apertures 118 accept strands of conduit 109 from coiled conduit sources 110, the output apertures 120 provide the accepted conduit strands 109 to a point of use, which as described below is preferably a trough, trench or furrow created at least in part by the plow blades 108. In an embodiment, the plurality of coiled conduit sources 110 are rotatably positioned above the input aperture 118 of the drop feed tubes 106 using a spindle frame 122. The spindle frame 122 includes one or more spindles (not shown) around which the coiled conduit sources 110 rotate when strands of conduit 109 are being pulled through the drop feed tubes 106.

In operation, the multi-plow attachment 100 is lowered (e.g., by use of the hydraulic arm 104) such that the plow blades 108 engage a body of soil at a desired or otherwise predetermined depth. In accordance with various embodiments, the depth at which the plow blades 108 engage the soil may be based on one or more of any number of factors including, for example, the distance between the plow blades 108 and the frame 101, the pitch of the plow blades 108 and the relative degree at which the hydraulic arm 104 is lowered. As the tractor 102 moves forward the plow blades 108 create trenches having a depth in the soil substantially equal to the desired depth.

Also, during operation, the strands of conduit 109 are fed into the drop feed tubes 106 from the plurality of coiled conduit sources 110 and output into the trenches being created by the plow blades 108 as the tractor 102 moves forward. The strands of conduit 109 are thus installed at substantially the desired depth below the surface of the soil. Prior to engaging the tractor 102 to drive forward, however, the ends of the strands of conduit 109 are held down in order to provide a force thereon for reeling the conduit 109 from the coiled conduit sources 110 as the tractor 102 moves forward.

Figure 9:
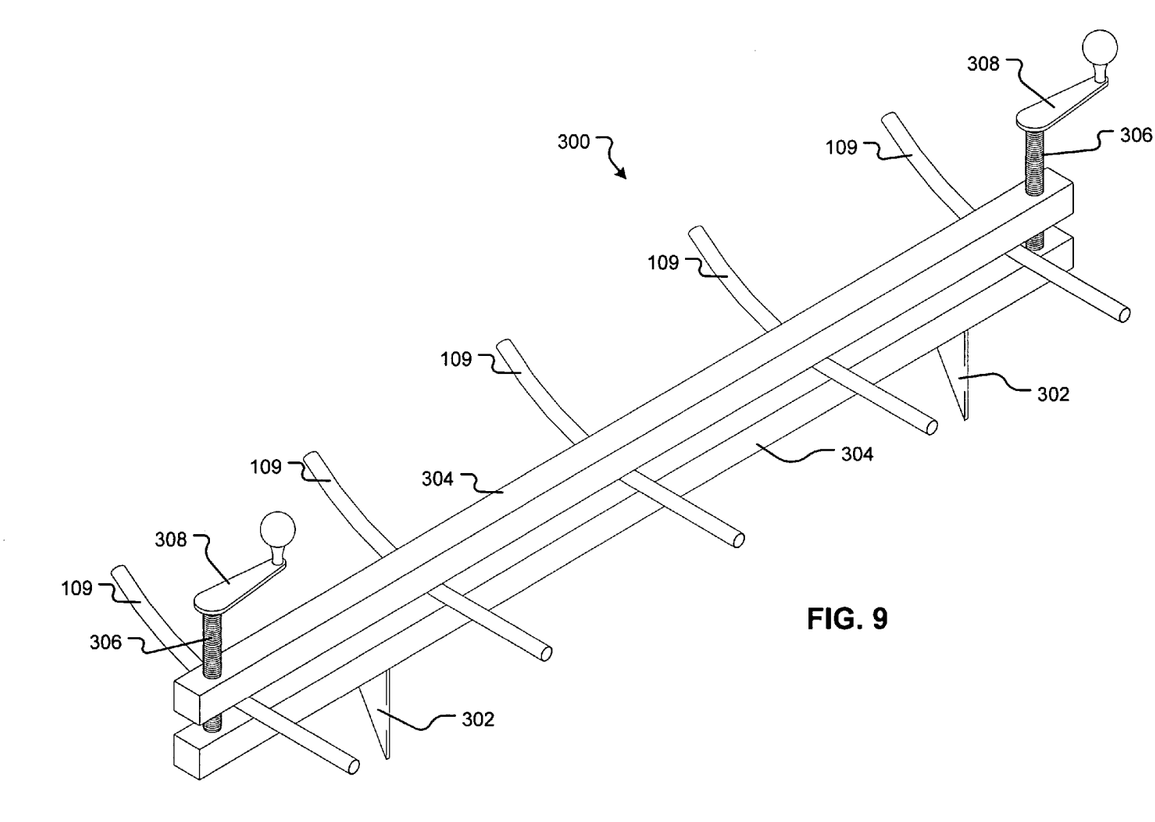
FIG. 9 is a device for holding conduit in the ground during installation of the conduit using the attachment shown in FIGS. 1-3.

In this regard, FIG. 9 depicts a device 300 for holding down conduit strands 109 at the beginning of the terrain being plowed in accordance with an embodiment of the present invention. This device 300 includes at least one anchor 302, a plurality of parallel planks 304 and a plurality of vice screws 306. Prior to plowing, end portions of the strands of conduit 109 are placed between the parallel bars 304 and the vice screws 306 are turned clockwise (e.g., by handle 308 or other means) to provide a significant pressure between the parallel planks 304 thereby rendering tight contact between the strands of conduit 109 and both parallel planks 304. As such, the end portions of the conduit strands 109 are considered to be "sandwiched" between the two parallel planks 304. Then, the device 300 is anchored to the ground by the anchors 302 in a manner such that, as the tractor 102 moves forward, the conduit strands 109 are reeled from the coiled conduit sources 110 and fed through the drop feed tubes 106 into the trenches created by the plow blades 108.

Referring now to FIG. 2, the multi-plow attachment 100 depicted in FIG. 1 is shown and described in greater detail in accordance with an embodiment of the present invention. The frame 101 of the multi-plow attachment 100 includes a plurality of toolbars 130, one or more mounting plates 140 and at least two end plates 138. In an embodiment, the various components of the frame 101 are made of metal, and preferably steel, but may alternatively be formed of any other material suitable for holding the plow blades 108 and drop feed tube 106 components as the plow blades 108 cut through the ground and conduit strands 109 are pulled through the drop feed tube 106 for deposit into trenches created by the plow blades 108.

The one or more mounting plates 140 are preferably positioned in a mid-section of the frame 101 and provide the frame 101 with a connection medium to the vibratory box 112. With respect to the exemplary vibratory box 112 shown in FIG. 1, the frame 101 includes four (4) mounting plates 140, each of which include an aperture 142 through which the first bolt 114 connects the mounting plates 140 to the mounting plates 124 of the vibratory box 112. In this embodiment, each of the mounting plates 124 of the vibratory box 112 are positioned between two of the mounting plates 140 on the frame 101 and include an aperture (not shown) in alignment with the apertures 142 such that the first bolt 114 may protrude through all of the mounting plates (124 and 140) and be fastened to at least a washer and a nut to provide a tight or rigid contact between the mounting plates 140 of the frame 101 and the mounting plates 124 of the vibratory box 112. Accordingly, oscillations produced by the vibratory box 122 are communicated to the frame 101 (and thus, the plow blades 108) by way of the contact between the mounting plates 140 of the frame 101 and the mounting plates 124 of the vibratory box 112.

Each toolbar 130 includes a foundation rod 132, a pair of end caps 134 and a plurality of spacers 135. The foundation rods 132 are shown in dashed lines in FIG. 2 to represent the location of the foundation rods 132 being internal to the toolbars 130. The foundation rods 132 are contiguous rods between the end plates 138 of toolbars 130 and, in an embodiment, have threaded ends 137 that protrude outwardly relative to the end plates 138. In an embodiment, the cross section of the foundation rods 132 resembles a rectangle, and more particularly, a square, as shown in both FIGS. 2 and 3. However, the shape of the foundation rods 132 may vary in accordance with alternative embodiments and indeed any shape is contemplated within the scope of the present invention.

The end caps 134 of each toolbar 130 are positioned on the outside of the end plates 138. The end caps 134 each include an aperture through which the threaded ends 137 of the foundation rods 132 protrude at least as far as to enable at least a nut 136, and preferably also a washer 139, to be screwed on to each of the threaded ends 137. The nuts 136 (and preferably, washers 139) are screwed on the threaded ends 137 such that the end caps 134 form a tight contact with the outside surface of the edge plates 138 either alone or in combination with a spacer 135, the latter of which (i.e., end cap 134 with spacer 135) is shown in FIG. 2 in accordance with an exemplary embodiment.

The toolbars 130 may be classified as either a "rear" toolbar 130 or a "front" toolbar 130, depending on the position of each toolbar 130 on the frame 101 relative to the tractor 102. That is, the toolbars 130 closest to the tractor 102 are designated as "front" toolbars because these toolbars 130 are located at the front of the frame 101 with respect to the tractor 102. Accordingly, the other toolbars 130 on the frame 101 are designated as "rear" toolbars, and in an embodiment, are the toolbars 130 on which the plow blades 108 and drop feed tubes 106 are attached. As shown in FIG. 2, the frame 101 includes two rear toolbars 130 and one front toolbar 130. The rear toolbars 130 are positioned one above the other and are sized substantially the same length, as is the front toolbar 130 with respect to the rear toolbars 130. In an alternative embodiment, any one of the toolbars 130 (front or rear) may be sized at a different length with respect to any one of the other toolbars 130.

Referring now to FIG. 3, the frame 101 is shown depicting a cross section of the rear toolbars 130 and an end plate 138 in order to illustrate in greater detail certain components of the multi-plow attachment 100 in accordance with an embodiment of the present invention. Each plow blade 108 includes a front edge 150 and a rear edge 152. The front edge 150 extends from the rear toolbars 130 and toward the front toolbar 130 in downward fashion such as to form a vertex 151 global ("vertex 151" to "vertex 151"). Each plow blade 108 is associated with a drop feed tube 106. Each drop feed tube 106 is coupled to (e.g., by welding, bolt and nut pairs or other means) the rear edge 152 of the associated plow blade 108. For illustrative purposes, each plow blade 108 and its associated drop fee tube 106 is collectively referred to herein as a plow assembly 154.

The plow blades 108, the end plates 138 and the mounting plates 140 include apertures (shown as 180 and 182 in FIGS. 4-5, 6A-6C and 7 for the plow blades 108; not shown for the end plates 138 and the mounting plates 140) through which the foundation rods 136 contiguously protrude or extend the length (L) of the frame 101. As such, these apertures are shaped substantially to fit the cross sectional shape of the foundation rods 136. For example, the cross section of the foundation rod 136 is shown to resemble a square, which is the same shape as the apertures of the plow blades 108, the end plates 138 and the mounting plates 140. In an embodiment, the radii of some or all of these apertures are sized slightly larger than the radii of the associated foundation rods 136 such that the plow assemblies 154 are operable to slide in substantially tight contact across the foundation rods 136 from end to end without the presence of spacers 135. In an exemplary embodiment, each of the apertures are sized in this manner.

A rigid spacer 135 is positioned between each plow assembly 154 and an adjacent plow blade assembly 154 and any adjacent end plate 138. In an embodiment, the spacers 154 are pre-cut such that the length of the spacers 154 define the distance between plow assemblies 154. In this embodiment, the spacing between plow blade assemblies 154 enables a user to customize the distance between trenches being cut by the plow blades 108 while the frame 101 is being pulled forward by a tractor 102.

In accordance with an embodiment of the present invention, the multi-plow attachment 100 also includes a plurality of coulter discs 156 and terrain push downs 158. The coulter discs 156 and the terrain push downs 158 are coupled to the front toolbar 130. The coulter discs 156 are aligned with the front edge 150 of the plow blade 108 such as to operate in substantially the same line of action in a body of terrain. As such, the coulter disc 156 serves to create a furrow in the soil thereby cutting through any plant material or other matter prior to the associated plow blade 156 engaging the soil to create the trenches therein.

As described above, the coulter discs 156 facilitate creation of trenches by the plow blades 108. In accordance with another embodiment, terrain push downs 158 may also be provided to facilitate creation of the trenches by the plow blades 108. The terrain push downs 158 supplement the coulter discs 156, as shown in FIGS. 1-3, but alternatively, may be used on the multi-plow attachment 100 without the coulter discs 156.

The multi-plow attachment 100 preferably includes two (2) terrain push downs 158 for each plow assembly 154. Each pair of terrain push downs 158 is operable to push or hold down the sides of the soil being cut by the associated plow blade 108. That is, the plow blade 108 associated with each pair of terrain push downs 158 cuts the soil between the pair of terrain push downs 158 as the ground directly to the sides of the cut is being applied a force by those terrain push downs 158.

In accordance with an embodiment, each terrain push down 158 is constructed of a substantially flat plate 160, a spring neck 162 and a coupling component 164. While the flat plates 160 are attached to one end of the spring necks 162, the coupling components 164 are attached to the opposite end of the spring necks 162, as shown in FIG. 3. The method of attachment of the flat plates 160 and the coupling components 164 to the spring necks 162 is shown as being accomplished using conventional bolt 163 and nut (not shown) pairings. However, any known method of attachment (e.g., welding, etc.) is contemplated within the scope of the present invention.

The flat plates 160 are the components of the terrain push downs 158 responsible for interfacing the surface of the terrain being cut. The coupling components 164, which are fastened to the front toolbar 130 by welding or other means, couple the terrain push downs 158 to the front toolbar 130. The spring necks 162 extend from the front toolbar 130 downwardly toward the rear toolbars 130 thereby positioning the flat plates 160 at a vertical position above the vertex 151 of the plow blades 108 in a manner such that the lower surfaces of the flat plates 160 interface the subject terrain as the front edges 150 of the plow blades 108 engage the terrain to create trenches therein.

In accordance with an embodiment, the coupling components 164 of the terrain push downs 158 are each welded to a spacer 135 on the front toolbar 130, as shown in FIG. 3. In an alternative embodiment, one or more of the spring necks 162 may be directly coupled (e.g., by welding, bolt and nut pairs, etc.) to a spacer 135, thereby removing the necessity for the coupling components 164 for those one or more spring necks 162. Regardless of the implementation (i.e., direct coupling or indirect coupling by way of coupling components 164), the spacers 135 to which the terrain push downs 158 are coupled also provide the front toolbar 130 with a medium to which the coulter discs 156 may be coupled, as shown in FIG. 3. In this embodiment, coulter discs 156 are positioned substantially between each of the pair of terrain push downs 158 on the associated spacers 135, which incidentally, this positioning places the coulter discs 156 substantially in line with the plow blades 108.

Figure 4:
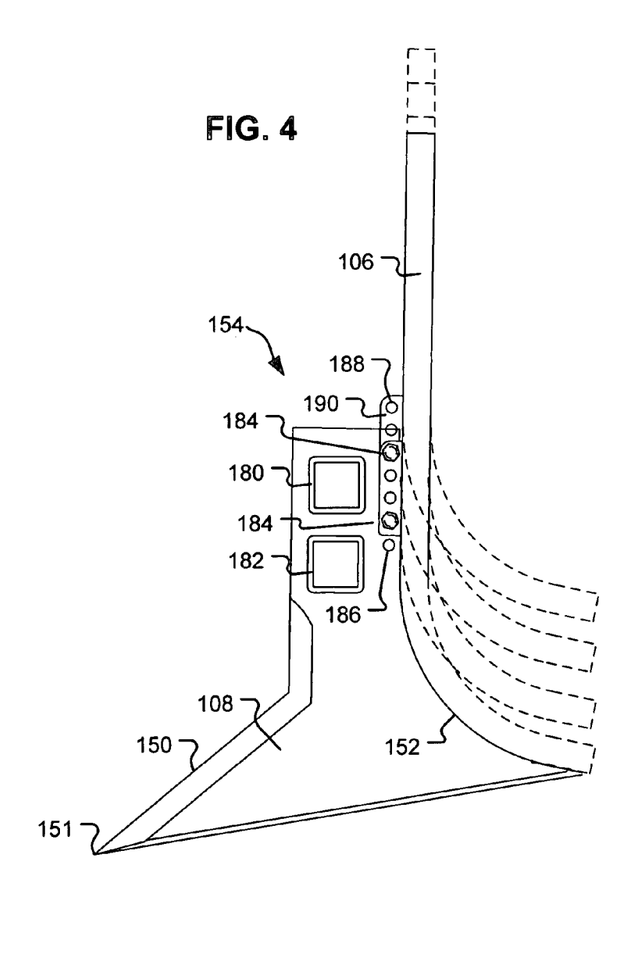
FIG. 4 illustrates varying positions for coupling a drop feed tube to a plow blade to form a plow assembly in accordance with an embodiment of the present invention.

Referring now to FIG. 4, a plow assembly 154 is shown in accordance with an embodiment of the present invention. In this embodiment, the plow blade 108 is coupled to the drop feed tube 106 by way of a plurality of bolts 184 and associated nuts (not shown) and washers (not shown). To accomplish this, the rear edge 152 of the plow blade 108 includes a plurality of apertures sized to fit the bolts 184. Likewise, the drop feed tube 106 includes an attachment 190 that has apertures 188 also sized to fit the bolts 184. The position of the drop feed tube 106 relative to the rear edge 152 of the plow blade 108 may be varied by selectively inserting each bolt 184 into both an aperture 188 on the tube multi-plow attachment 190 and an aperture 186 on the drop feed tube 106 and securing the bolt 184 therein using a washer (optional) and a nut. The dashed lines 188 illustrate exemplary varying positions of the drop feed tubes 106 relative to the rear edge 152 of the plow blade 108.

As noted above, one of the factors that determines the depth of the trenches being created by the multi-plow attachment 100 is the pitch of the individual plow blades 108 relative to the terrain being plowed using the attachment 100. For example, an embodiment of the present invention involves increasing the pitch of the plow blades 108 in order to maintain a desired trench depth as more plow blades 108 are added to the attachment 100. This is because, in general, the greater the number of plow blades 108, the greater the resistance during plowing, which consequently requires a greater pitch in the blades 108 to create trenches of the desired depth.

With this in mind, and referring collectively to FIGS. 5 and 6A-6C, a variety of approaches for varying the pitch of a plow blade 108 of a plow assembly 154 are shown in accordance with embodiments of the present invention. Because terrain often varies in slope, it is often helpful to measure pitch of the plow blades 108 of the attachment using a more permanent reference point such as, for example, the rear toolbar 130 or the terrain push downs 158. Furthermore, when taking these different approaches into account, it should be appreciated that the pitch of any one or more plow blades 108 on a multi-plow attachment 100 may vary with respect to the other plow blades 108 on that same multi-plow attachment 100.

Figure 5:
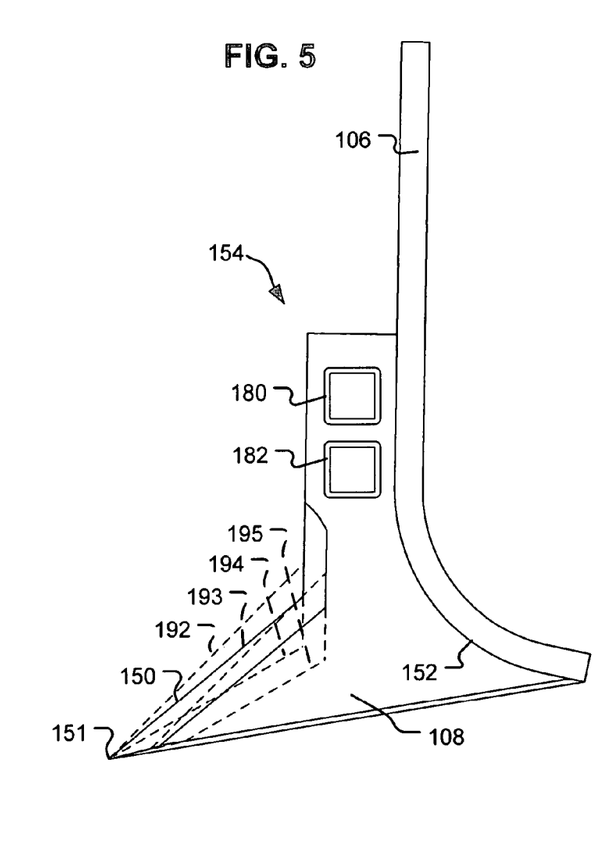
FIG. 5 illustrates varying degrees of angularity that may be used to construct a plow blade such that the plow blade has a desired pitch in accordance with an embodiment of the present invention.

Referring now specifically to FIG. 5, one approach to varying the pitch of a plow blade 108 by varying the degrees of angularity 192-195 of the front edge 150 of the plow blade 108 relative to the vertex 151 is shown in accordance with an embodiment of the present invention. It should be appreciated that the different degrees of angularity 192-195 shown in FIG. 5 are exemplary only and illustrate that the front edge 150 of the plow blade 108 may be constructed of any angle between zero and ninety degrees. The actual degree of angularity of the front edge 150 of the plow blade 108 is a matter of choice and the invention is thus not limited to any specific angularity.

Figure 6A:
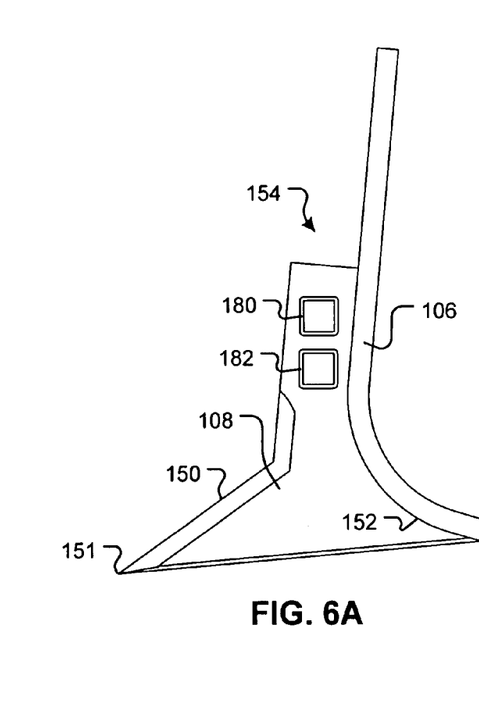
FIGS. 6A-6C illustrate three alternative construction designs for a plow blade that may be used to construct the plow blade to have a desired pitch in accordance with an embodiment of the present invention.
Figure 6B:
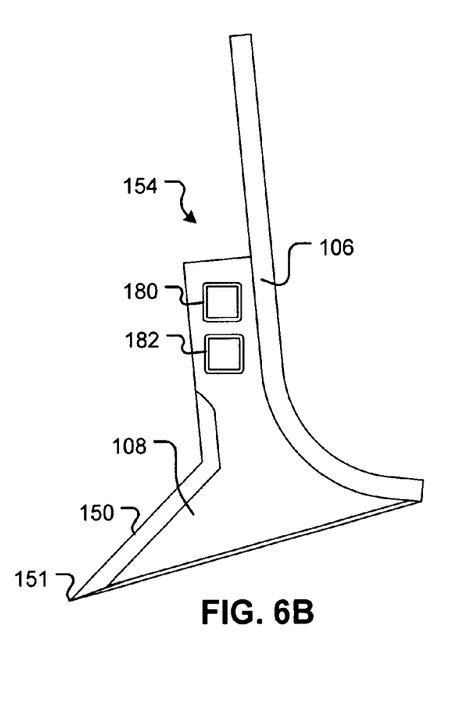
Figure 6C:
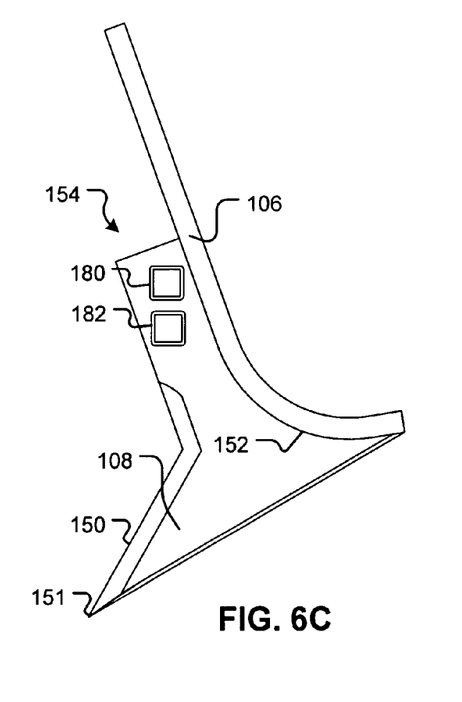

Turning now to FIGS. 6A-6C, an approach for varying the pitch of a plow blade 108 by pivoting the plow blade 108 relative to the rear toolbars 130 to which the blade 108 is attached is shown in accordance with another embodiment of the present invention. In this embodiment, the degree of rotation of the apertures 180 and 182 on a plow blade 108 may be varied (by rotation) such that, when the plow blade 108 is installed on the rear toolbar 130, the pitch of the plow blade 108 also varies. More particularly, FIG. 6A illustrates a degree of rotation of the apertures 180 and 182 substantially equal to zero degrees, and as such, the pitch of the plow blade 108 is shown as a substantially normalized pitch. In FIG. 6B, the apertures 180 and 182 have been rotated clockwise relative to zero degrees, and as such, the pitch of the plow blade 108 is shown to be greater than the normalized pitch shown in FIG. 6A. Likewise, in FIG. 6C, the apertures 180 and 182 have been rotated even further clockwise than shown in FIG. 6B, and consequently, the pitch of the plow blade 108 is shown to be greater than the pitch shown in FIG. 6B.

Figure 7:
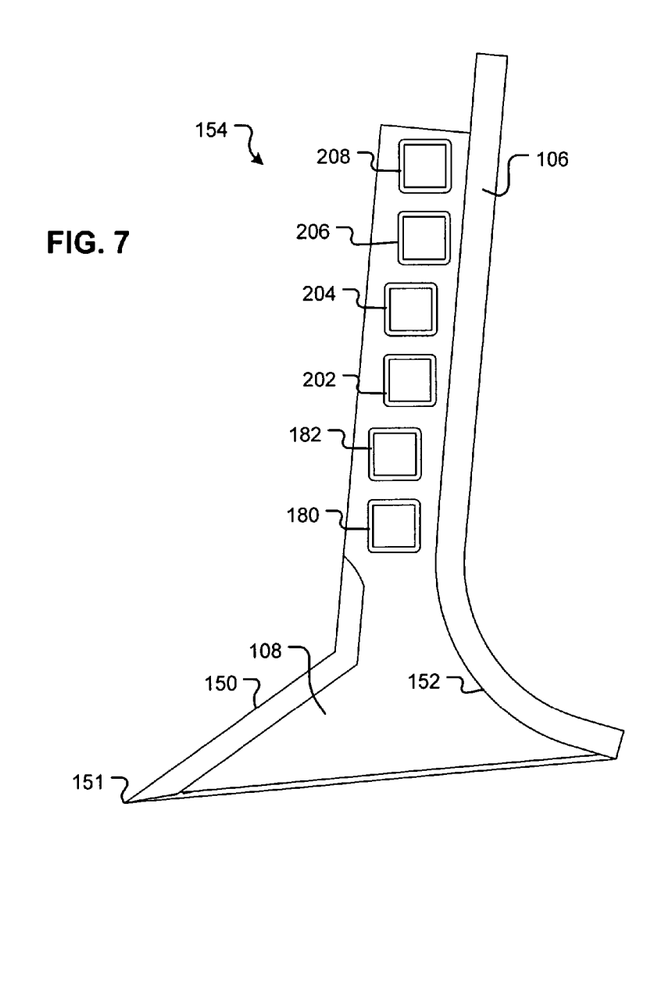
FIG. 7 is a plow assembly having a plow blade with a plurality of height adjustment apertures in accordance with an embodiment of the present invention.

Another factor that determines the depth of the trenches being created by the multi-plow attachment 100 is the distance from the vertex 151 of the plow blade 108 to the terrain push downs 158, this distance being substantially equal to the desired depth of the trenches. With this in mind, FIG. 7 illustrates a plow assembly 154 having a plow blade 108 with a plurality of selectable apertures 180, 182, 202, 204, 206 and 208. Each of the plurality of apertures 180, 182, 202, 204, 206 and 208 belongs to a pair of apertures (i.e., 180 and 182, 202 and 204, 206 and 208) that may be selected for installation on the pair of rear toolbars 130. Selection of one of these three aperture pairs (i.e., 180 and 182, 202 and 204, 206 and 208) renders one of three predetermined distances from the vertex 151 of the plow blade 108 to its associated terrain push downs 158. Of course, another embodiment contemplates determining the distance between the vertex 151 of the plow blade 108 to the terrain push downs 158 while manufacturing the plow blade 158. In this embodiment, only a single pair of apertures is formed on the plow blade 158 at a position thereon based on the desired distance.

Figure 11:
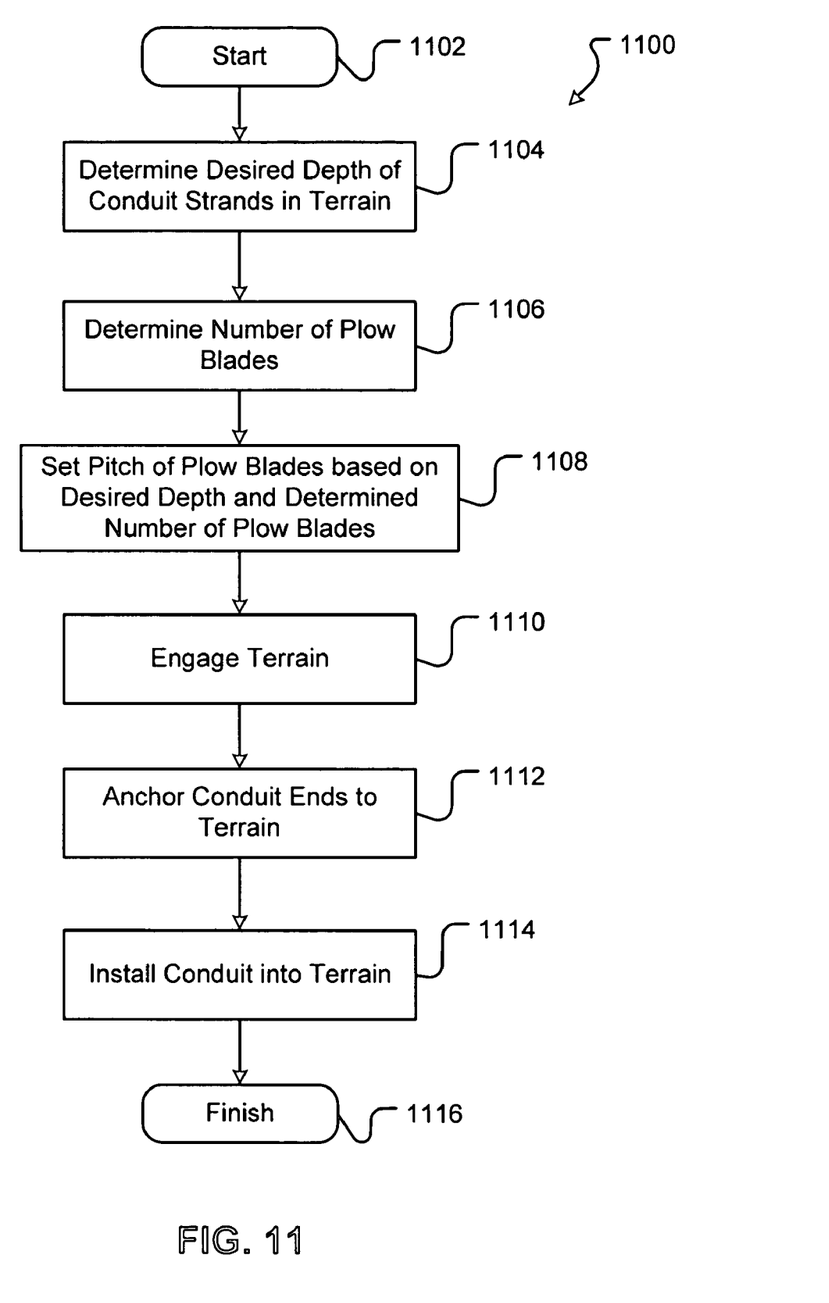
FIG. 11 is a flow diagram illustrating operational characteristics for installing multiple strands of conduit below a surface of ground in accordance with an embodiment of the present invention.

Turning now to FIG. 11, a method 1100 for installing multiple strands of conduit 109 below a surface of ground is shown in accordance with an embodiment of the present invention. In this embodiment, this method 1100 is practiced using the multi-plow attachment 100 and therefore embodies actions that are manually performed using a tractor 102 or other pulling device. Also, in accordance with an embodiment, the installation method 1100 involves user actions that take into account the physical design of the multi-plow attachment 100 relative to the pitch of the plurality of plow blades 108. With this in mind, an exemplary embodiment of the installation method 1100 involves actions having an operational flow that begins with a starting action 1102 and concludes with a terminating action 1116.

The starting action 1102 involves a user deciding to install multiple conduit strands 109 below the surface of one or many bodies of terrain (referred to hereinafter as "terrain"). In an embodiment, the conduit strands 109 are strands of drip irrigation conduit. As noted above, other forms of conduit are contemplated within the scope of the present invention. From the start action 1102, the operation flow passes to a first determining action 1104.

The first determining action 1104 involves the user selecting a desired depth at which the conduit is to be buried below the surface of the terrain. Many considerations may go into this particular decision and, in this regard, the scope of the present invention is not limited in any manner to a specific desired depth nor any considerations that go into deciding same. In fact, the various strands of conduit 109 may be installed at either the same desired depth, or alternatively, at varying desired depths. Regardless of the manner of implementation, the operation flow passes from the first determining action 1104 to a second determining action 1106.

The second determining action 1106 involves the user determining the number of conduit strands 109 that are to be installed into the terrain, which in turn, determines the number of plow blades 108 that will be included on the multi-plow attachment 100. Any number of conduit strands 109 greater than one (1), and thus any number of plow blades 108 greater than one (1), are contemplated in accordance with an embodiment of the present invention. From the second determining action 1106, the operation flow passes to a pitch setting action 1108.

The pitch setting action 1108 involves setting the pitch for each of the plurality of plow blades 108 on the multi-plow attachment 100 based on the depth desired for the installation of each conduit strand 109 as well as the number of plow blades 108 determined for the attachment 100. In general, the greater the number of plow blades 108, the greater the resistance during plowing, which consequently requires a greater pitch in the blades 108 to create trenches of the desired depth. As such, the pitch setting action 1108 takes into consideration the number of plow blades 108, as determined in the second determining action 1106, in setting the pitch for each of the blades 108 to render the desired depth therefrom.

As noted above, an embodiment of the present invention involves increasing the pitch of the plow blades 108 relative to the greater the number of plow blades 108 included on the attachment 100. For example, if the pitch of a plow blade 108 to render a desired depth is X degrees relative to the rear toolbar 130 having two (2) plow blades 108, the pitch of that plow blade 108 would be greater than X degrees if more than two (2) plow blades 108 are included on that same rear toolbar 130. In this embodiment, FIGS. 5 and 6A-6C illustrate exemplary approaches for varying the pitch of a plow blade 108 by pivoting the plow blade 108 relative to the rear toolbars 130 to which the blade 108 is attached. Accordingly, such pivoting may be addressed during manufacture of the plow blades 108. Alternatively, the plow blades 108 may be constructed with a determined pitch and pivotally coupled to the rear toolbar 130 to enable rotation therearound In this manner, the user may alter (i.e., customize) the pitch of the plow blades 108 prior to the installation of conduit strands 109 into different bodies of terrain that may require different desired depths with respect to one another. Regardless of the implementation, the operational flow of the installation method 1100 passes from the pitch setting action 1108 to an engaging action 1110.

In the engaging action 1100, the multi-plow attachment 100 is lowered such that the plurality of plow blades 108 engage the terrain at substantially the desired depth(s) (not taking into consideration any solid materials, e.g., rocks or tree roots, that affect the blades 108 engaging at the desired depth). Next, the operation flow passes to an anchoring action 1112 in which the ends of the conduit strands 109 are fed through the input apertures 118 of the drop feed tubes 108 and anchored to the terrain in a manner such that, as the multi-plow attachment 100 is pulled forward a force is created on the conduit sources 110 as to effectively unwind the sources 110 and install the conduit strands 109 into the terrain. In an embodiment, the anchoring action 1112 involves the device 300 illustrated in FIG. 9. After the ends of the conduit strands 109 are anchored, the operation flow passes to an installing action 1114 in which the multi-plow attachment 100 is pulled forward, the plow blades 108 create trenches in the terrain and the conduit strands 109 are installed therein. From the installing action 1114, the operation flow concludes at the termination operation 1116.

It will be clear that the present invention is well adapted to attain the ends and advantages mentioned, as well as those inherent therein. While a presently preferred embodiment has been described for purposes of this disclosure, various changes and modifications may be made which are well within the scope of the present invention. For example, the frame 101 is shown having two rear toolbars 130, but may alternatively be constructed with only a single rear toolbar 130. In this embodiment, the various degrees of pitch desired for the plow blades 108 may still be accomplished using the approaches described above in FIG. 5 and FIGS. 6A-6C, but instead of having two apertures 180 and 182, the plow blades only have a single aperture 180. As such, the approach described in FIGS. 6A-6C would be modified in this embodiment such that the degree of rotation of only this single aperture 180 is varied.

Figure 8:
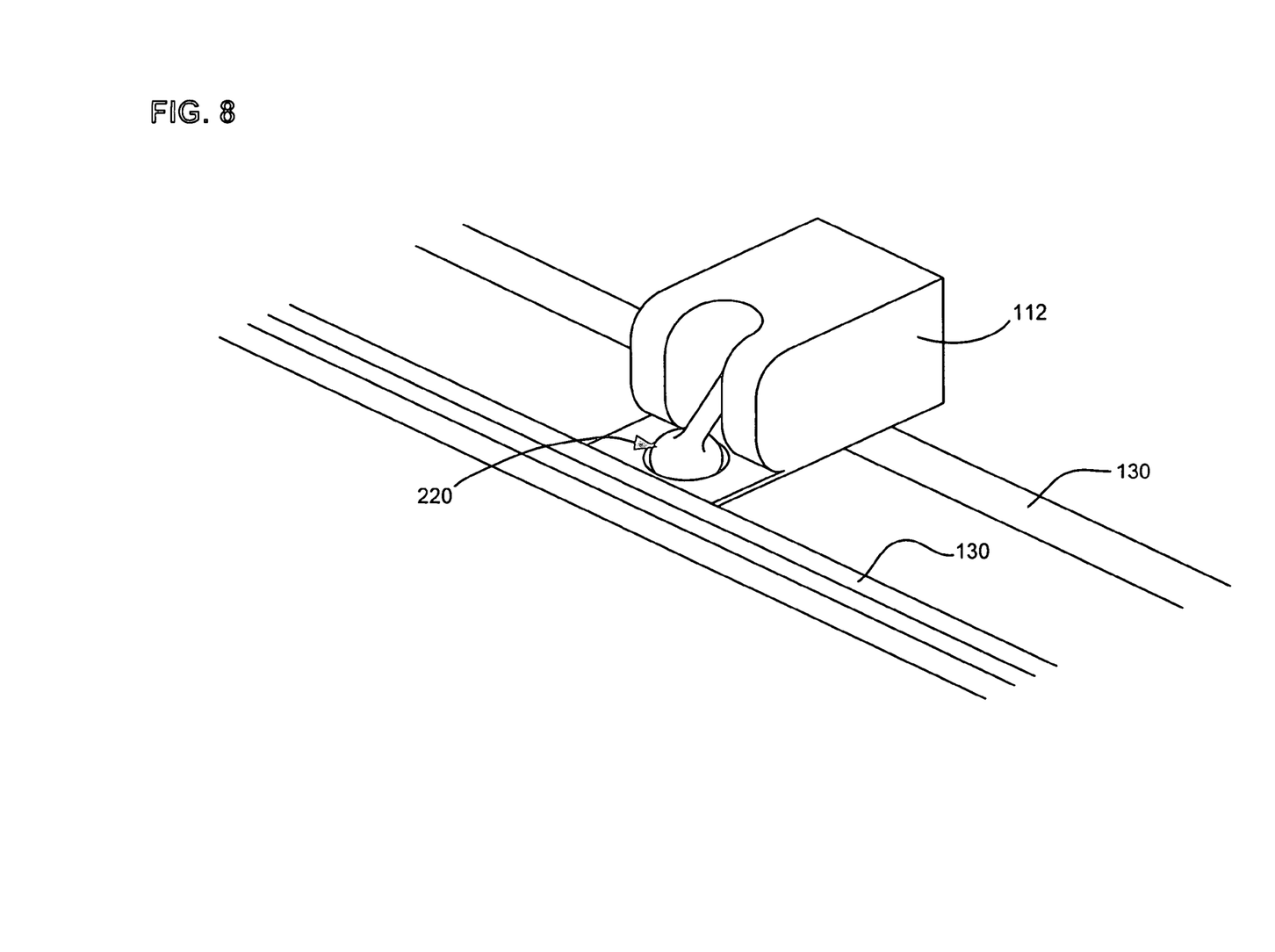
FIG. 8 depicts the attachment of FIG. 1 in accordance with an alternative embodiment of the present invention.

In another embodiment, the frame 101 of the multi-plow attachment 100 connects to the vibratory box 112 by way of a pivot 220 rather than by way of mounting plates 124, as generally shown in FIG. 8. The pivot 220 may be any conventional pivot known to those skilled in the art and preferably provides the multi-plow attachment 100 with the ability to roll in response to any one of the plow blades 108 encountering an obstacle (e.g., rock, tree root, etc.) in the soil of the terrain being plowed that causes that plow blade 108 to be jolted upwards. As such, the plow blades 108 on the other side of the frame 101 from the plow blade 101 encountering the obstacle are able to continue plowing the terrain without interruption.

Figure 10:
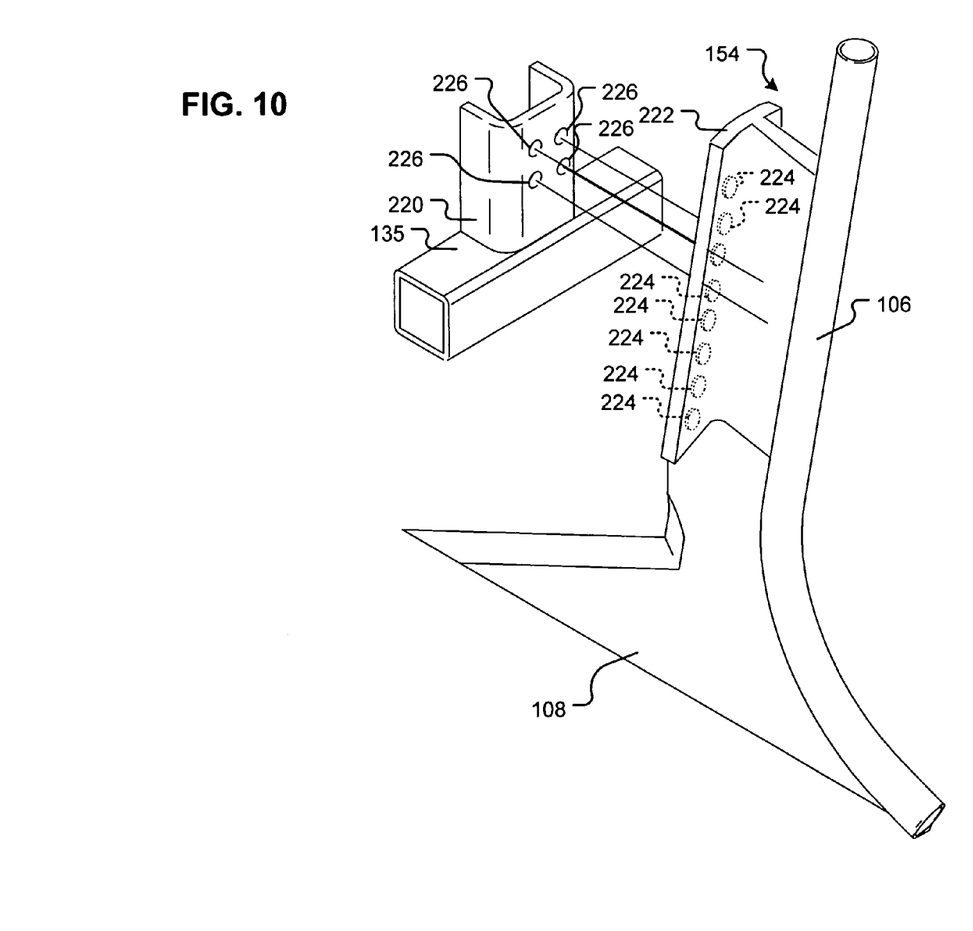
FIG. 10 illustrates an approach for coupling a plow assembly to the attachment of FIGS. 1-3 in accordance with an alternative embodiment of the present invention.

In yet another embodiment, the plow assemblies 154 are attached to the frame 101 by way of coupling components rather than the apertures (e.g., 180 and 188). For example, FIG. 10 illustrates the use of an exemplary coupling component 220 operable to couple a plow assembly 154 to a spacer 135 and an associated mounting plate 222 for use on a plow assembly 154. In this embodiment, the coupling component 220 is welded or otherwise affixed to the spacer 135 and the spacer 135 is used on a rear toolbar 130 as described with respect to the means by which the terrain push downs 158 are coupled to the front toolbar 130 by way of coupling components 164. By providing the plow assemblies 154 with mounting plates 222 having multiple apertures 224 for selectively matching to apertures 226 in the coupling components 220, the distance between the vertex 151 on the blades 108 and the terrain push downs 158 may be readily adjusted to help meet the desired plow depth. While only shown in FIG. 10 to located on one side of the mounting plate 222, the multiple apertures 224 are preferably on both sides thereof as illustrated by the coupling component 220 having two pairs of apertures 226 aligned in vertical fashion. Also, in this embodiment, only a single rear toolbar 130 may be utilized for the frame 101 when the plow assemblies 154 are coupled thereto in this manner.

Even further, while the actions of FIG. 11 are described with reference to an exemplary sequence, it should be appreciated that these actions may be readily performed in another sequence and/or other actions may be performed in addition to those shown in FIG. 11 and described in conjunction therewith. Numerous other changes may be made which will readily suggest themselves to those skilled in the art and which are encompassed in the spirit of the invention disclosed and as defined in the appended claims.

What is claimed is:

1. An apparatus for installing multiple strands of conduit below a surface of a body of terrain, the apparatus comprising:
   a first horizontal toolbar;
   a plurality of coiled conduit sources; and
   a plurality of plow assemblies coupled to the first horizontal toolbar and spaced apart from one another across the first horizontal toolbar by rigid spacers, wherein each of the plow assemblies comprise a blade and a feed tube, the blade downwardly extending from the first horizontal toolbar in a first direction and the feed tube downwardly extending from the first horizontal toolbar in a second direction opposite the first direction, wherein the feed tubes are operable to accept strands of conduit from respective coiled conduit sources and deposit the accepted conduit strands in trenches created in the body of terrain by the blades when the apparatus is pulled across the body of terrain.

2. An apparatus as defined in claim 1, further comprising:
   a vibratory box coupled to the horizontal toolbar by one or more mounting plates and operable to induce oscillations in the plow assemblies for facilitating creation of trenches by the blades.

3. An apparatus as defined in claim 2, further comprising:
   a second horizontal toolbar;
   a first end plate coupling a first end of the first horizontal toolbar to a first end of the second horizontal toolbar; and
   a second end plate coupling a second end of the first horizontal toolbar to a second end of the second horizontal toolbar, wherein the one or more mounting plates couple the first horizontal toolbar to the second horizontal toolbar at a position on the first and second toolbars between the first end plate and the second end plate.

4. An apparatus as defined in claim 3, further comprising:
   a plurality of terrain push downs coupled to the second horizontal toolbar and downwardly extending in the second direction toward the first horizontal toolbar, wherein a terrain push down is positioned on both sides of each of the plurality of plow assemblies.

5. An apparatus as defined in claim 3, further comprising:
   a plurality of coulter discs coupled to and downwardly extending from the second horizontal toolbar, wherein each plow assembly is substantially in line with a coulter disc such that the coulter disc engages the body of terrain prior to the blade when the apparatus is pulled across the body of terrain.

6. An apparatus as defined in claim 1, wherein the apparatus is attached to an arm on a tractor, the apparatus further comprising:
   a pivot coupling the first horizontal toolbar to the arm at substantially a midpoint of the first horizontal toolbar such that a first plow assembly is located on a right side of the first horizontal toolbar relative to the pivot and a second plow assembly is located on a left side of the first horizontal toolbar relative to the pivot, wherein the pivot is operable to roll the toolbar in the direction of one of the first and second plow assembly in response to the other of the first and second plow assembly being pushed upward upon encountering an obstacle when plowing.

7. An apparatus as defined in claim 6, further comprising:
a vibratory box coupled between the arm of the tractor and the pivot and operable to induce oscillations in the plow assemblies for facilitating creation of trenches in the body of terrain by the blades.

8. An apparatus as defined in claim 1, wherein a first of the plurality of blades has a pitch different than a second of the plurality of blades.

9. An apparatus as defined in claim 1, further comprising:
a third horizontal toolbar to which each of the plurality of plow assemblies are coupled and wherein the plurality of plow assemblies are spaced apart from one another across the third horizontal toolbar by rigid spacers.

10. An apparatus for installing multiple strands of conduit below a surface of a body of terrain, the apparatus comprising:
a first horizontal toolbar;
a plurality of coiled conduit sources;
a plurality of plow assemblies coupled to the first horizontal toolbar and comprising a blade and a feed tube, the blade downwardly extending from the first horizontal toolbar in a first direction and the feed tube downwardly extending from the first horizontal toolbar in a second direction opposite the first direction, wherein the feed tubes are operable to accept strands of conduit from coiled conduit sources and deposit the accepted conduit strands in trenches created in the body of terrain by the blades when the apparatus is pulled across the body of terrain; and
a vibratory box coupled to the horizontal toolbar and operable to induce oscillations in the plow assemblies for facilitating creation of trenches in the body of terrain by the blades.

11. An apparatus as defined in claim 10, further comprising:
a pivot coupling the vibratory box to the first horizontal toolbar at substantially a midpoint on the first horizontal toolbar such that a first plow assembly is located on a right side of the first horizontal toolbar relative to the pivot and a second plow assembly is located on a left side of the first horizontal toolbar relative to the pivot, wherein the pivot is operable to roll the toolbar in the direction of one of the first and second plow assembly in response to the other of the first and second plow assembly being pushed upward upon encountering an obstacle when plowing.

12. An apparatus as defined in claim 10, further comprising:
a second horizontal toolbar;
a first end plate coupling a first end of the first horizontal toolbar to a first end of the second horizontal toolbar; and
a second end plate coupling a second end of the first horizontal toolbar to a second end of the second horizontal toolbar, wherein the one or more mounting plates couple the first horizontal toolbar to the second horizontal toolbar at a position on the first and second toolbars between the first end plate and the second end plate, wherein the vibratory box is coupled between the one or more mounting plates and a point of attachment to a tractor.

13. An apparatus as defined in claim 12, further comprising:
a plurality of terrain push downs coupled to the second horizontal toolbar and downwardly extending in the second direction toward the first horizontal toolbar, wherein a terrain push down is positioned on both sides of each of the plurality of plow assemblies.

14. An apparatus as defined in claim 12, further comprising:
a plurality of coulter discs coupled to and downwardly extending from the second horizontal toolbar, wherein each plow assembly is substantially in line with a coulter disc such that the coulter disc engages the body of terrain prior to the blade when the apparatus is pulled across the body of terrain.

15. A method for installing multiple strands of conduit below a surface of ground using a multi-plow attachment having a plurality of plow blades and drop feed tubes, the method comprising:
determining a pitch for the plow blades operable to create a trench in the ground having a predetermined depth relative to the surface;
adjusting the plow blades to the determined pitch;
lowering the multi-plow attachment such that the plurality of plow blades engage the ground at the predetermined depth based at least in part on the determined pitch of the plow blades;
feeding the strands of conduit through the drop feed tubes;
anchoring to the ground an end portion of each of the strands of conduit fed through the drop feed tubes; and
pulling the multi-plow attachment across the surface of the ground such that the plurality of plow blades create trenches of substantially the predetermined depth in the ground and the drop feed tubes are deposited therein.

16. A method as defined in claim 15, wherein the determining act comprises:
taking into consideration an actual quantity of the plurality of plow blades such that if more plow blades are added to the multi-plow attachment, then the pitch determined to be operable for the predetermined depth increases.

17. A method as defined in claim 15, further comprising:
providing the multi-plow attachment with a vibratory box; and
during performance of the pulling act, activating the vibratory box to induce oscillations in the plurality of plow blades.

18. A method as defined in claim 15, wherein the strands of conduit comprise at least one strand of drip irrigation tubing.

19. A method as defined in claim 15, wherein the anchoring act comprises:
squeezing the end portions of the strands of conduit between two parallel planks; and
staking the two parallel planks into the ground.

20. A method as defined in claim 15, wherein the act of pulling is performed using a tractor.

* * * * *